(12) United States Patent
Noorizadeh et al.

(10) Patent No.: US 11,409,800 B1
(45) Date of Patent: Aug. 9, 2022

(54) GENERATING SEARCH QUERIES FOR DATABASE SEARCHING

(71) Applicant: Bank of America Corporation, Charlotte, NC (US)

(72) Inventors: Emad Noorizadeh, Plano, TX (US); Isaac Thomas Persing, Sierra Vista, AZ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/384,571

(22) Filed: Jul. 23, 2021

(51) Int. Cl.
*G06F 7/00* (2006.01)
*G06F 16/9032* (2019.01)
*G06F 16/248* (2019.01)
*G06F 16/2455* (2019.01)
*G06F 16/2457* (2019.01)
*G10L 15/26* (2006.01)
*G06N 20/00* (2019.01)

(52) U.S. Cl.
CPC ...... *G06F 16/90328* (2019.01); *G06F 16/248* (2019.01); *G06F 16/2457* (2019.01); *G06F 16/24565* (2019.01); *G06N 20/00* (2019.01); *G10L 15/26* (2013.01)

(58) Field of Classification Search
CPC ......... G06F 16/90328; G06F 16/24565; G06F 16/2457; G06F 16/248; G06F 16/908; G06F 16/90344; G06F 16/9024; G06F 16/313; G06N 20/00; G06N 7/005; G10L 15/26
See application file for complete search history.

(56) References Cited

U.S. PATENT DOCUMENTS

| | | | |
|---|---|---|---|
| 7,685,084 | B2 | 3/2010 | Sisk et al. |
| 7,716,216 | B1 | 5/2010 | Harik et al. |
| 7,840,569 | B2 | 11/2010 | Meyerzon et al. |
| 8,229,948 | B1 | 7/2012 | Ershov |
| 8,321,431 | B2 | 11/2012 | Quick et al. |
| 8,392,436 | B2 | 3/2013 | Bai et al. |
| 8,504,361 | B2 | 8/2013 | Collobert et al. |
| 9,047,283 | B1 | 6/2015 | Zhang et al. |
| 9,477,654 | B2 | 10/2016 | He et al. |
| 9,535,960 | B2 | 1/2017 | Guo et al. |

(Continued)

FOREIGN PATENT DOCUMENTS

| | | | |
|---|---|---|---|
| EP | 2815335 A1 | 12/2014 |
| GB | 2499395 A | 8/2013 |

(Continued)

*Primary Examiner* — Mohammad A Sana (57) ABSTRACT

A device configured to receive a data request comprising instructions for retrieving data. The device is further configured to input the instructions into a machine learning model that is configured to output a plurality of search token predictions for an entity based on the instructions. The device is further configured to generate a set of search query candidates based on the plurality of search token predictions. Each search query candidate comprises zero or more search tokens. The device is further configured to select a search query candidate based on a score that is associated with the search query candidate and to generate a search query using the search tokens from the selected search query candidate. The device is further configured to receive search results in response to sending the search query to the database and to output search results based on the search.

20 Claims, 3 Drawing Sheets

(56) References Cited

U.S. PATENT DOCUMENTS

| | | |
|---|---|---|
| 9,779,356 B2 | 10/2017 | Driscoll |
| 10,015,124 B2 | 7/2018 | Mcgregor, Jr. et al. |
| 10,089,580 B2 | 10/2018 | Shan et al. |
| 10,254,935 B2 | 4/2019 | Mazzocchi et al. |
| 10,268,734 B2 | 4/2019 | Deluca |
| 10,353,940 B1 | 7/2019 | Carr et al. |
| 10,387,461 B2 | 8/2019 | Sharifi et al. |
| 10,547,574 B2 | 1/2020 | Pham |
| 10,778,614 B2 | 9/2020 | Arzumanyan et al. |
| 2002/0129015 A1 | 9/2002 | Caudill et al. |
| 2005/0004905 A1 | 1/2005 | Dresden |
| 2005/0278362 A1 | 12/2005 | Maren et al. |
| 2006/0026013 A1 | 2/2006 | Kraft |
| 2006/0277033 A1 | 12/2006 | Gao et al. |
| 2007/0124263 A1 | 5/2007 | Katariya et al. |
| 2007/0136281 A1 | 6/2007 | Li et al. |
| 2007/0203869 A1 | 8/2007 | Ramsey et al. |
| 2008/0243820 A1 | 10/2008 | Chang et al. |
| 2009/0125501 A1 | 5/2009 | Gao et al. |
| 2009/0259651 A1 | 10/2009 | Tankovich et al. |
| 2009/0276414 A1 | 11/2009 | Gao et al. |
| 2009/0282022 A1 | 11/2009 | Bennett |
| 2010/0161641 A1 | 6/2010 | Gustafson et al. |
| 2010/0250547 A1 | 9/2010 | Grefenstette et al. |
| 2011/0208709 A1 | 8/2011 | Holthausen |
| 2011/0208735 A1 | 8/2011 | Gao et al. |
| 2011/0270604 A1 | 11/2011 | Qi et al. |
| 2011/0276599 A1 | 11/2011 | Connor |
| 2012/0158621 A1 | 6/2012 | Bennett et al. |
| 2012/0233160 A1 | 9/2012 | Koomullil et al. |
| 2013/0239006 A1 | 9/2013 | Tolkachev |
| 2014/0279773 A1 | 9/2014 | Chen et al. |
| 2018/0157721 A1 | 6/2018 | Khaitan et al. |
| 2020/0004790 A1 | 1/2020 | Jeong et al. |
| 2021/0224275 A1* | 7/2021 | Maheshwari .......... G06N 3/084 |
| 2021/0263971 A1* | 8/2021 | Landes ................. G06F 16/908 |
| 2022/0100763 A1* | 3/2022 | Sen ........................ G06N 20/00 |

FOREIGN PATENT DOCUMENTS

| | | |
|---|---|---|
| WO | 2013121181 A1 | 8/2013 |
| WO | 2015023304 A1 | 2/2015 |
| WO | 2015028898 A1 | 3/2015 |

* cited by examiner

GENERATING SEARCH QUERIES FOR DATABASE SEARCHING

TECHNICAL FIELD

The present disclosure relates generally to databases, and more specifically to generating search queries for database searching.

BACKGROUND

Generating search queries for data based on user-provided instructions poses several technical challenges. For example, a user may provide a data request with instructions that are in plain English using their user device. Databases, however, are typically configured to receive and process search queries that are in a particular format. This means that the user's instructions that are in plain English cannot be directly used as a search query. Another technical challenge occurs when trying to interpret a user's instructions to generate a search query since the user may use any combination of terms to describe the data they are interested in. Performing an exhaustive search of the words and phrases provided by the user is computationally intensive and results in high resource utilization. The high resource utilization means that the processing resources of a computing system are occupied for longer durations of time while processing a user's instructions. The reduced availability of processing resources means that fewer processing resources are available for processing other data requests which negatively impacts the throughput of the system.

SUMMARY

The disclosed system provides several practical applications and technical advantages that overcome the previously discussed technical problems. For example, the disclosed system provides a practical application by providing a process that leverages a combination of machine learning and natural language processing to identify search tokens within user-provided instructions that can be used to retrieve data from a database. This process enables an information system to receive user instructions that are provided in plain English and to interpret the user's instructions to identify search tokens that can be used to generate a search query for retrieving data for the user. In a first phase, the information system inputs the user's instructions into a machine learning model to reduce the search space for identifying search tokens within the user's instructions. By first reducing the search space, the information system is able to reduce the number of processing resources that are used and the amount of time that the processing resources are occupied compared to other approaches that use an exhaustive search. This provides a practical application that improves resource utilization when analyzing the instructions. In a second phase, the information system uses natural language process to further refine the user's instructions to identify one or more search tokens that can be used in a search query to obtain the requested data from a database. After the identifying search tokens within the user's instructions, the information system is able to perform a database search using the identified search token and to provide the requested data to the user. This process provides a practical application by improving the system's ability to ingest data requests and output the requested data. These practical applications not only improve the system's ability to ingest data requests but also improve the underlying network and the devices within the network. For example, this disclosed process allows the system to process data requests that include user instructions in plain English without requiring additional hardware resources which increases the number of hardware resources that are available for other processes and increases the throughput of the system.

In one embodiment, the information system comprises a device that is configured to receive a data request comprising instructions for retrieving data. The device is further configured to input the instructions into a machine learning model that is configured to output a plurality of search token predictions for an entity based on the instructions. The device is further configured to generate a set of search query candidates based on the plurality of search token predictions. Each search query candidate comprises one or more search tokens. The device is further configured to select a search query candidate based on a score that is associated with the search query candidate and to generate a search query using the search tokens from the selected search query candidate. The device is further configured to receive search results in response to sending the search query to the database and to output search results based on the search.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
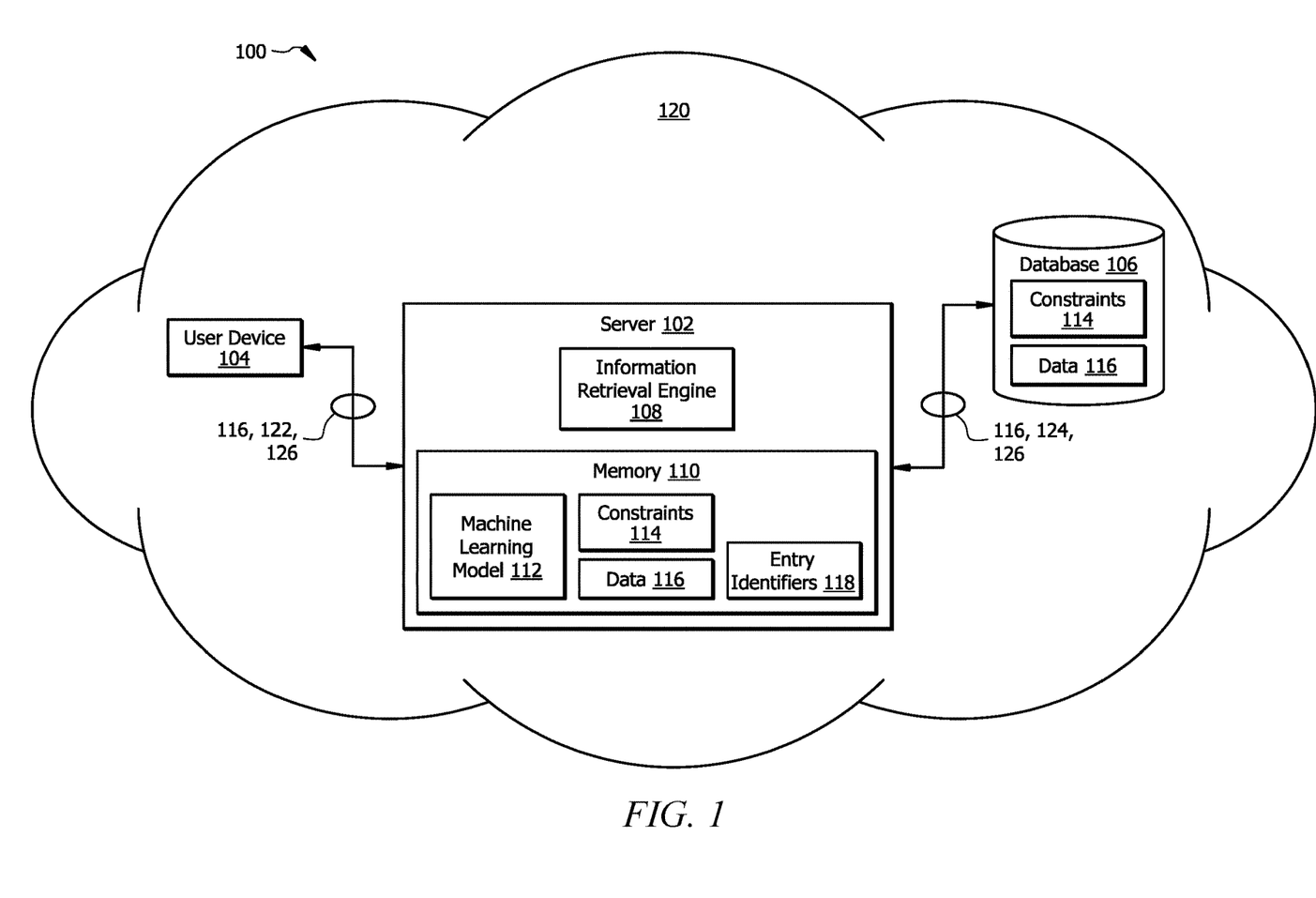
FIG. 1 is a schematic diagram of an embodiment of an information system that is configured to generate search queries for database searching.

FIG. 1 is a schematic diagram of an embodiment of an information system 100 that is configured to generate search queries 124 for database searching. The information system 100 is configured to employ a combination of machine learning and natural language processing to identify search tokens 308 that can be used to retrieve data 116 from a database 106 for a user. In a first phase, the information system 100 uses a machine learning model 112 to reduce the search space for identifying search tokens 308 within instructions 302 that are provided by a user. By reducing the search space the information system 100 is able to reduce the number of processing resources that are used and the amount of time that processing resources are occupied, which improves resource utilization when analyzing the instructions 302. In a second phase, the information system 100 uses natural language process to further refine the instructions 302 to identify one or more search tokens 308 that can be used in a search query 124 to obtain the requested data 116 from the database 106.

In one embodiment, the information system 100 comprises a server 102, a user device 104, and one or more databases 106 that are in signal communication with each other over a network 120. The network 120 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 120 may be configured to support any suitable type of communication protocol as would be appreciated by one of ordinary skill in the art.

User Devices

Examples of user devices 104 include, but are not limited to, a smartphone, a tablet, a laptop, a computer, a smart device, an Internet-of-Things (IoT) device, or any other suitable type of device. A user device 104 is configured to send a data request 122 for data 116 to the server 102. The data request 122 comprises instructions 302 that identify or describe data 116 that a user is interested in retrieving from memory (e.g. database 106). A user may generate a data request 122 on a user device 104 using an application, a web browser, chat interface, an automated call service, or any other suitable type of technique. For example, a user may generate a data request 122 by providing text instructions 302 to an application or chat interface that identifies data 116. As another example, a user may generate a data request 122 using their voice to provide instructions 302 that identify data 116 that the user is interested in using an application. In some examples, the user device 102 may convert words spoken by the user into text that is used to generate the data request 122. The user device 104 is further configured to receive the requested data 116 and to present the data 116 to a user using a graphical user interface (e.g. a display or touch screen).

Databases

Examples of a database 106 include, but are not limited to, file repositories, computers, databases, memories, servers, shared folders, or any other suitable type of networking device. The database 106 is generally configured to store constraints 114, data 116, and/or any other suitable type of information that is associated with the information system 100. The constraints 114 generally comprise rules for identifying valid search tokens 308 for a search query 124. An example of a constraint 114 is a rule for ignoring search query candidates 306 that comprise entities whose search tokens 310 overlap in the search query 302. Another example of a constraint 114 is a rule for ignoring search query candidates 306 that comprise multiple entities having the same entity identifier 118. Another example of a constraint 114 is a rule for ignoring search query candidates 306 that comprise more than one entity search token 310. Another example of a constraint 114 is a rule for ignoring search query candidates 306 that do not comprise an entity search token 310. The constraints 114 may further comprise any other suitable type of rules for filtering a set of search query candidates 306. Examples of data 116 include, but are not limited to, text, documents, files, images, videos, account information, transaction history, or any other suitable type of data. In FIG. 1, the information system 100 shows a single database 106. In other embodiments, the information system 100 may comprise any other suitable number of databases 106.

Server

Examples of the server 102 include, but are not limited to, a server, a computer, or any other suitable type of network device. In one embodiment, the server 102 comprises an information retrieval engine 108 and a memory 110. Additional details about the hardware configuration of the server 102 are described in FIG. 4. The memory 110 is configured to store machine learning models 112, constraints 114, data 116, entity identifiers 118, and/or any other suitable type of data.

In one embodiment, the information retrieval engine 108 is generally configured to process data requests 122 to identify search tokens 308 for requesting data 116 for a user from the database 106. A search token 308 comprises text (e.g. a word or phrase) that identifies or describes a particular type of data 116. In one embodiment, the information retrieval engine 108 is configured to employ machine learning to identify potential search tokens 308 for requesting data 116 from the database 106. Performing an exhaustive comparison of terms within a data request to different types of identifiers is computationally intensive since each term will need to be compared to a large list of identifiers. Instead, the server 102 uses the machine learning model 112 to reduce the search space when identifying particular types of search tokens 308 such as entity search token 310. The server 102 then filters the results from the machine learning model 112 to identify the best set of search tokens 308 for requesting data 116 for a user. An example of the information retrieval engine 108 in operation is described in more detail below in FIG. 2.

Examples of machine learning models 112 include, but are not limited to, a multi-layer perceptron, a recurrent neural network (RNN), an RNN long short-term memory (LSTM), a convolutional neural network (CNN), or any other suitable type of neural network model. In one embodiment, the machine learning model 112 is generally configured to receive text from a data request 122 as an input and to output search token predictions 304 based on the provided text. The machine learning model 112 is trained using training data that comprises different types of text. During the training process, the machine learning model 112 determines weights and bias values that allow the machine learning model 112 to map certain types of text to different types of search tokens 308. Through this process, the machine learning model 112 is able to identify search token predictions 304 based on the text within a data request 122. The information retrieval engine 108 may be configured to train the machine learning models 112 using any suitable technique as would be appreciated by one of ordinary skill in the art. In some embodiments, the machine learning models 112 may be stored and/or trained by a device that is external from the server 102.

Each entity identifier 118 comprises a value (e.g. an alphanumeric value) that is uniquely associated with an entity. Examples of an entity include, but are not limited to, an individual, a business, a service provider, a vendor, or any other suitable type of third-party. In some embodiment, the memory 110 may further comprise additional types of identifiers. For example, the memory 110 may comprise date identifiers 312 that correspond with days of the week, data type identifiers 314 that correspond with different data types, or any other suitable type of identifier.

An Information Retrieval Process

Figure 2:
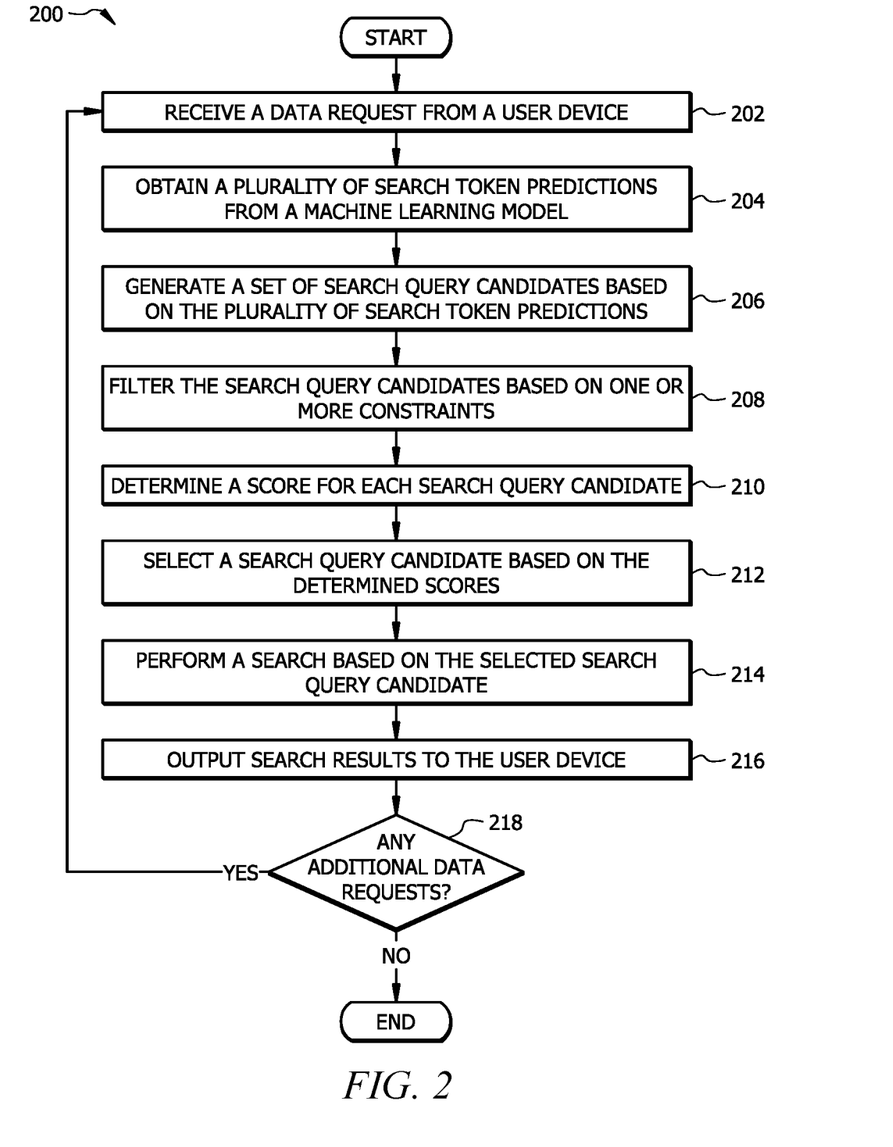
FIG. 2 is a flowchart of an embodiment of an information retrieval process for the information system.

FIG. 2 is a flowchart of an embodiment of an information retrieval process 200 for the information system 100. The information system 100 may employ process 200 to generate search queries 124 for retrieving data 116 for a user based on instructions 302 provided by the user. Process 200 employs a combination of machine learning and natural language processing to identify search tokens 308 that can be used to retrieve data 116 from a database 106 for a user.

Figure 3:
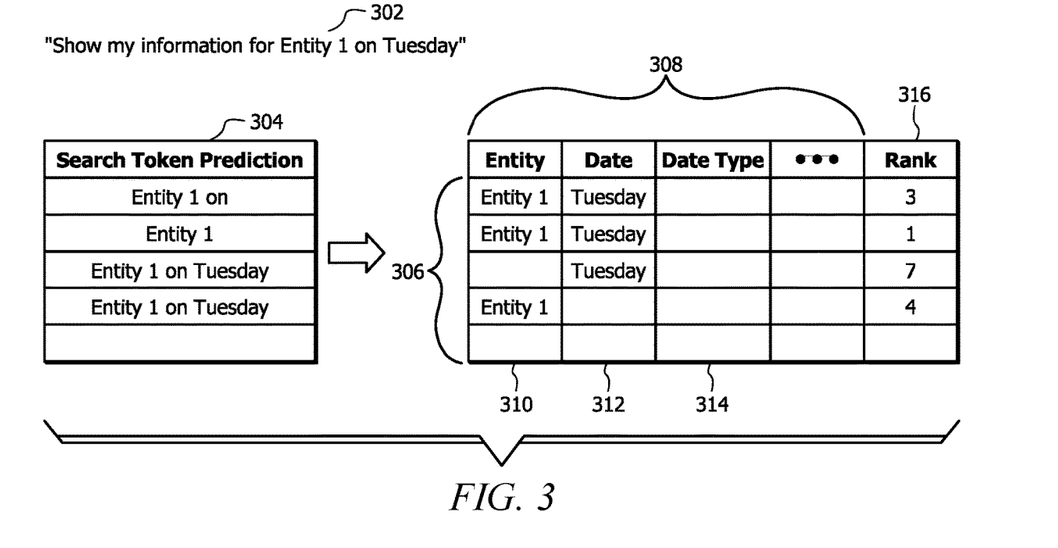
FIG. 3 is an example of a relationship between instructions for retrieving data and search query candidates.

At step 202, the server 102 receives a data request 122 from a user device 104. The data request 122 comprises instructions 302 that identifies or describes data 116 that a user would like to retrieve. As an example, the data request 122 may comprise a text message with the instructions 302. As another example, the data request 122 may comprise an audio signal such as a voice recording from the user with the instructions 302. In this example, the server 102 converts the audio signal to a text message that comprises the instructions 302. The data request 122 may comprise instructions 302 for retrieving text, documents, files, images, videos, account information, transaction history, or any other suitable type of data 116 from the database 106. Referring to FIG. 3 as an example, the data request 122 may comprise instructions 302 with text that says "Show my information for Entity 1 on Tuesday." In this example, the user is requesting information from their historical information that is associated with a particular entity on a particular day. In other examples, the data request 122 may comprise any other suitable type of instructions 302. The data request 122 may also comprise information that identifies the user. For example, the data request 122 may comprise a name, a user name, an account identifier, a phone number, an email address, or any other suitable type of information that identifies a user.

To correctly identify the data 116 the user is requesting within a database 106, the server 102 will first identify the entity that is associated with the data 116. At step 204, the server 102 obtains a plurality of search token predictions 304 for an entity from the machine learning model 112. A search token prediction 304 comprises a portion of the text from the instructions 302 that identifies an entity that is associated with the data 116 the user is requesting. The server 102 begins this process by inputting the instructions 302 into the machine learning model 112. In response to inputting the instructions 302 in the machine learning model 112, the server 102 receives a plurality of search token predictions 304 for the entity from the machine learning model 112. Returning to the example in FIG. 3, the machine learning model 112 may output search token predictions 304 that comprise one or more terms from the instructions 302. In this example, the machine learning model 112 outputs search token predictions 304 that comprise different combinations of the terms from the instructions 302 in an attempt to identify the entity that is associated with the requested data 116. Using the machine learning model 112 to identify the search token predictions 304 reduces the search space when analyzing the instructions 302 to identify an entity. By reducing the search space the server 102 is able to reduce the number of processing resources that are used and the amount of time that processing resources are occupied, which improves resource utilization when analyzing the instructions 302.

After obtaining the search token predictions 304, the server 102 then processes the search token predictions 304 to determine which search token prediction 304 best corresponds with the entity that is associated with the requested data 116. Returning to FIG. 2 at step 206, the server 102 generates a set of search query candidates 306 based on the plurality of search token predictions 304. A search query candidate 306 comprises zero or more search tokens 308. Each search token 308 may be associated with a different field of a search query 124. Examples of search tokens 308 include, but are not limited to, an entity search token 310, a date search token 312, a data type search token 314, or any other suitable type of search token that can be used to identify data 116. In some embodiments, the combination of search tokens 308 within a search query candidate 306 may be selected to correspond with the format of search queries 124 that are accepted by a database 106. In other words, the search tokens 308 correspond with fields in a search query 124 that are specific to a particular database 106.

The server 102 parses and analyzes the search token predictions 304 to determine whether any of the search token predictions 304 correspond with an entity. In one example, the server 102 first parses a search token prediction 304 to identify the terms within the search token prediction 304. The server 102 then compares the identified terms to a set of entity identifiers 118. Each entity identifier 118 comprises a value (e.g. an alphanumeric value) that is uniquely associated with an entity. In response to identifying a term from the search token prediction 304 that matches an entity identifier 118, the server 102 maps the identified term to an entity search token 310. The server 102 may also compare the terms of other types of identifiers to map the terms to other types of search tokens 308. For example, the server 102 may compare the terms from the search token prediction 304 to a list of days of the week to determine whether any of the terms correspond with a day of the week. In the example shown in FIG. 3, the terms may include the term "Tuesday." In this example, the server 102 maps the term "Tuesday" to a date search token 312. In other examples, the server 102 may map any other terms from the search token prediction 304 to any other suitable type of search token. In other embodiments, the server 102 may employ any other suitable type of natural language processing techniques to identify search tokens 308 within the search token predictions 304. The server 102 may repeat the process of generating a search query candidate 306 for each search token prediction 304.

At step 208, the server 102 filters the search query candidates 306 based on one or more constraints 114. For example, the server 102 may apply a constraint 114 with a rule for ignoring search query candidates 306 that comprise more than one entity search token 310. In this case, the constraint 114 discards or ignores search query candidates 306 that include multiple entity search tokens 310. The presence of multiple entity search tokens 310 may indicate that an error has occurred and that one or more of the entity search token 310 may be invalid. As another example, the server 102 may apply a constraint 114 with a rule for ignoring search query candidates 306 that do not comprise an entity search token 310. In this case, the constraint 114 discards or ignores search query candidate 306 that do not include an entity search token 310 that can be used for requesting data 116. In other examples, the server 102 may apply any other suitable type or combination of constraints 114 with rules for filtering search query candidates 306.

At step 210, the server 102 determines a score 316 for each search query candidate 306. In one embodiment, the server 102 determines a score 316 for each search query candidate 306 based on how well its entity search token 310 correlates or matches a corresponding search token prediction 304. The score 316 may be a raw score, a rank, or any other suitable type of numeric value that indicates how well an entity search token 310 matches a search token prediction 304. At step 212, the server 102 selects a search query candidate 306 based on the determined scores 316. For example, the server 102 may select the search query candidate 306 with the highest rank or score 316.

At step 214, the server 102 performs a search based on the selected search query candidate 306. Here, the server 102 generates a search query 124 using the search tokens 308 from the search query candidate 306. The server 102 may use any suitable technique or protocol for generating and executing the search query 124 using the search tokens 308 from the selected search query candidate 306. For example, the server 102 may generate a search query 124 by populating data fields in the search query 124 with their corresponding search tokens 308. The server 102 may also include any information that identifies a user or a user profile within the search query 124 to identify the data 116 that is associated with the user. For example, the server 102 may include a name, a user name, an account identifier, a phone number, an email address, or any other suitable type of information that identifies a user. In some embodiments, the server 102 may identify a database 106 for searching based on the search tokens 308. For example, each database 106 may be configured to store data 116 that is associated with a particular entity. In this example, the server 102 may identify a database 106 to send a search query 124 to based on the entity search token 310. In other examples, the server 102 may identify a database 106 based on any other type or combination of search token 308. In some embodiments, the server 102 may also determine a format that is associated with the database 106 and then format the search query 124 based on the determined format. After generating the search query 124, the server 102 sends the search query 124 to the database 106 to request the data 116 for the user. The server 102 receives search results 126 that comprises the requested data 116 from the database 106 in response to sending the search query 124 to the database 106.

At step 216, the server 102 outputs search results 126 to the user device 104. The server 102 may output the search results 126 to the user device 104 by transmitting the data 116 as a message, an email, text, a file, a link, or in any other suitable format. For example, the server 102 may transmit text that comprises the data 116 as a message in a chat window, an application notification, or an email. As another example, the server 102 may transmit a file that includes the requested data 116. As another example, the server 102 may generate and transmit a link to the requested data 116. In other examples, the server 102 may output the search results 126 to the user device 104 using any other suitable technique.

At step 218, the server 102 determines whether there are any additional data requests 122 to process. Here, the server 102 may determine whether all of the received data requests 122 have been processed for the user. The server 102 returns to step 202 in response to determining that there are additional data requests 122 to process. In this case, the server 102 determines that there are additional data 116 searches remaining to perform for the user. The server 102 returns to step 202 to obtain another data request 122 for processing. The server 102 terminates process 200 in response to determining that there are no additional data requests 122 to process. In this case, the server 102 determines that there are no more data 116 searches to perform for the user.

Hardware Configuration for the Information Retrieval Device

Figure 4:
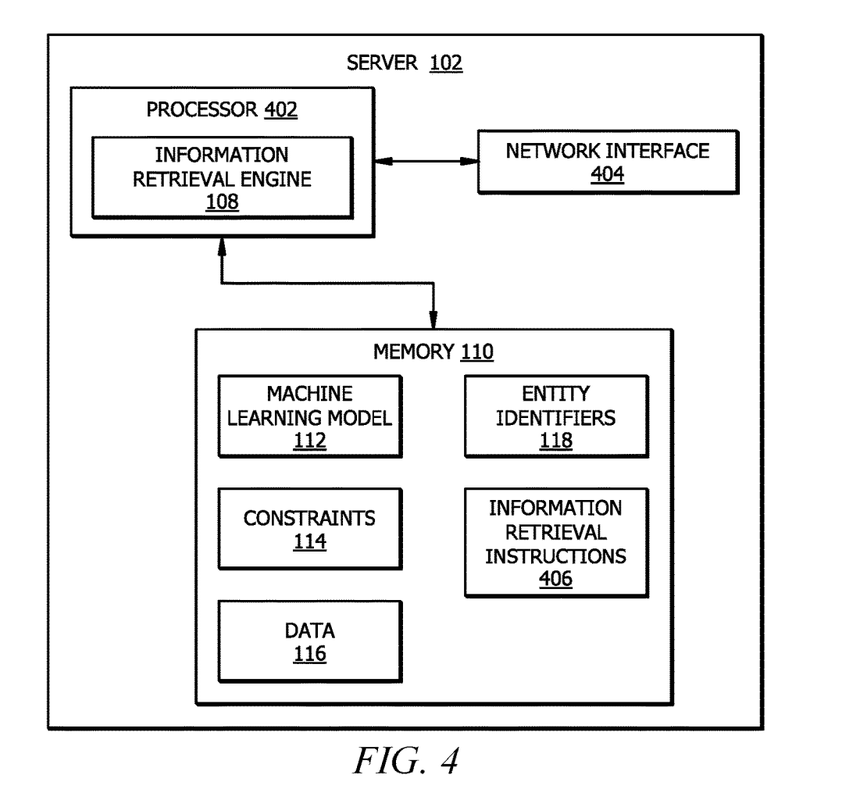
FIG. 4 is an embodiment of a device configured to generate search queries for database searching for the information system.

FIG. 4 is an embodiment of an information retrieval device for the information system 100. As an example, the information retrieval device may be the server 102. The information retrieval device comprises a processor 402, a memory 110, and a network interface 404. The server 102 may be configured as shown or in any other suitable configuration.

Processor

The processor 402 comprises one or more processors operably coupled to the memory 110. The processor 402 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 110 and the network interface 404. The one or more processors are configured to process data and may be implemented in hardware or software. For example, the processor 402 may be 8-bit, 16-bit, 32-bit, 64-bit, or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute information retrieval instructions 406 to implement the information retrieval engine 108. In this way, processor 402 may be a special-purpose computer designed to implement the functions disclosed herein. In an embodiment, the information retrieval engine 108 is implemented using logic units, FPGAs, ASICs, DSPs, or any other suitable hardware. The information retrieval engine 108 is configured to operate as described in FIGS. 1-2. For example, the information retrieval engine 108 may be configured to perform the steps of process 200 as described in FIG. 2.

Memory

The memory 110 is operable to store any of the information described above with respect to FIGS. 1-3 along with any other data, instructions, logic, rules, or code operable to implement the function(s) described herein when executed by the processor 402. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store information retrieval instructions 406, machine learning models 112, constraints 114, data 116, entity identifiers 118, and/or any other data or instructions. The information retrieval instructions 406 may comprise any suitable set of instructions, logic, rules, or code operable to execute the information retrieval engine 108. The machine learning models 112, the constraints 114, the data 116, and the entity identifiers 118 are configured similar to the machine learning models 112, the constraints 114, the data 116, and the entity identifiers 118 described in FIGS. 1-3, respectively.

Network Interface

The network interface 404 is configured to enable wired and/or wireless communications. The network interface 404 is configured to communicate data between user devices 104, databases 106, and other devices, systems, or domains. For example, the network interface 404 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information retrieval device, comprising:
   a network interface configured to communicate with a database; and
   a processor operably coupled to the network interface, and configured to:
   receive a data request comprising instructions for retrieving data;
   input the instructions into a machine learning model, wherein the machine learning model is configured to:
   receive the instructions; and
   output a plurality of search token predictions for an entity based on the instructions, wherein each search token prediction comprises one or more terms from the instructions;
   generate a set of search query candidates based on the plurality of search token predictions, wherein:
   each search query candidate comprises zero or more search tokens; and
   each search token comprises one or more terms from a search token prediction;
   determine a score for each search query candidate from among the set of search query candidates, wherein the score for each search query candidate is based on a correlation between terms that are mapped to each search token;
   select a search query candidate based on a score associated with the search query candidate;
   generate a search query using the search tokens from the selected search query candidate;
   send the search query to the database via the network interface;
   receive, via the network interface, search results in response to the sending the search query to the database; and
   output search results based on the search.

2. The device of claim 1, wherein receiving the data request comprises receiving a text message that comprises the instructions for retrieving data.

3. The device of claim 1, wherein receiving the data request comprises:
   receiving an audio signal; and
   converting the audio signal to a text message that comprises the instructions for retrieving data.

4. The device of claim 1, wherein generating the set of search query candidates comprises:
   identifying terms within a search token prediction;
   comparing the terms to a set of entity identifiers;
   identifying a term that matches an entity identifier from among the set of entity identifiers; and
   mapping the identified term to an entity search token that is associated with an entity.

5. The device of claim 1, further comprising a memory operable to store one or more constraints, wherein each constraint defines rules for valid search tokens in the search query; and
   wherein the processor is further configured to filter the set of search query candidates using the one or more constraints before determining the score for each search query candidate.

6. The device of claim 5, wherein filtering the set of search query candidates using the one or more constraints comprises ignoring search query candidates that comprise more than one entity search token.

7. The device of claim 5, wherein filtering the set of search query candidates using the one or more constraints comprises ignoring search query candidates that do not comprise an entity search token.

8. An information retrieval method, comprising:
   receiving a data request comprising instructions for retrieving data;
   inputting the instructions into a machine learning model, wherein the machine learning model is configured to:
   receive the instructions; and
   output a plurality of search token predictions for an entity based on the instructions, wherein each search token prediction comprises one or more terms from the instructions;
   generating a set of search query candidates based on the plurality of search token predictions, wherein:
   each search query candidate comprises zero or more search tokens; and
   each search token comprises one or more terms from a search token prediction;
   determining a score for each search query candidate from among the set of search query candidates, wherein the score for each search query candidate is based on a correlation between terms that are mapped to each search token;

selecting a search query candidate based on a score associated with the search query candidate;

generating a search query using the search tokens from the selected search query candidate;

sending the search query to a database;

receiving search results in response to the sending the search query to the database; and outputting search results based on the search.

9. The method of claim 8, wherein receiving the data request comprises receiving a text message that comprises the instructions for retrieving data.

10. The method of claim 8, wherein receiving the data request comprises:

receiving an audio signal; and converting the audio signal to a text message that comprises the instructions for retrieving data.

11. The method of claim 8, wherein generating the set of search query candidates comprises:

identifying terms within a search token prediction;

comparing the terms to a set of entity identifiers;

identifying a term that matches an entity identifier from among the set of entity identifiers; and mapping the identified term to an entity search token that is associated with an entity.

12. The method of claim 8, further comprising filtering the set of search query candidates using one or more constraints before determining the score for each search query candidate, wherein each constraint defines rules for valid search tokens in the search query.

13. The method of claim 12, wherein filtering the set of search query candidates using the one or more constraints comprises ignoring search query candidates that comprise more than one entity search token.

14. The method of claim 12, wherein filtering the set of search query candidates using the one or more constraints comprises ignoring search query candidates that do not comprise an entity search token.

15. A computer program product comprising executable instructions stored in a non-transitory computer-readable medium that when executed by a processor causes the processor to:

receive a data request comprising instructions for retrieving data;

input the instructions into a machine learning model, wherein the machine learning model is configured to:

receive the instructions; and output a plurality of search token predictions for an entity based on the instructions, wherein each search token prediction comprises one or more terms from the instructions;

generate a set of search query candidates based on the plurality of search token predictions, wherein:

each search query candidate comprises zero or more search tokens; and each search token comprises one or more terms from a search token prediction;

determine a score for each search query candidate from among the set of search query candidates, wherein the score for each search query candidate is based on a correlation between terms that are mapped to each search token;

select a search query candidate based on a score associated with the search query candidate;

generate a search query using the search tokens from the selected search query candidate;

send the search query to a database;

receive search results in response to the sending the search query to the database; and output search results based on the search.

16. The computer program product of claim 15, wherein receiving the data request comprises receiving a text message that comprises the instructions for retrieving data.

17. The computer program product of claim 15, wherein receiving the data request comprises:

receiving an audio signal; and converting the audio signal to a text message that comprises the instructions for retrieving data.

18. The computer program product of claim 15, wherein generating the set of search query candidates comprises:

identifying terms within a search token prediction;

comparing the terms to a set of entity identifiers;

identifying a term that matches an entity identifier from among the set of entity identifiers; and mapping the identified term to an entity search token that is associated with an entity.

19. The computer program product of claim 15, further comprising instructions that when executed by the processor causes the processor to filter the set of search query candidates using one or more constraints before determining the score for each search query candidate, wherein:

each constraint defines rules for valid search tokens in the search query; and filtering the set of search query candidates using the one or more constraints comprises ignoring search query candidates that comprise more than one entity search token.

20. The computer program product of claim 15, further comprising instructions that when executed by the processor causes the processor to filter the set of search query candidates using one or more constraints before determining the score for each search query candidate, wherein:

each constraint defines rules for valid search tokens in the search query; and filtering the set of search query candidates using the one or more constraints comprises ignoring search query candidates that do not comprise an entity search token.

\* \* \* \* \*